United States Patent
Yamamoto (10) Patent No.: US 11,940,823 B2
(45) Date of Patent: Mar. 26, 2024

(54) REFERENCE VOLTAGE GENERATION CIRCUIT

(71) Applicant: Rohm Co., Ltd., Kyoto (JP)

(72) Inventor: Seiichi Yamamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 82 days.

(21) Appl. No.: 17/780,131

(22) PCT Filed: Nov. 27, 2020

(86) PCT No.: PCT/JP2020/044149
§ 371 (c)(1),
(2) Date: May 26, 2022

(87) PCT Pub. No.: WO2021/111994
PCT Pub. Date: Jun. 10, 2021

(65) Prior Publication Data
US 2022/0413528 A1    Dec. 29, 2022

(30) Foreign Application Priority Data

Dec. 6, 2019 (JP) .................................. 2019-221241

(51) Int. Cl.
G05F 3/30 (2006.01)
G05F 1/46 (2006.01)
H02M 3/158 (2006.01)

(52) U.S. Cl.
CPC ............ *G05F 1/468* (2013.01); *H02M 3/158* (2013.01)

(58) Field of Classification Search
None
See application file for complete search history.

(56) References Cited

U.S. PATENT DOCUMENTS

| | | | |
|---|---|---|---|
| 5,808,459 A * | 9/1998 | Yazdy | G05F 1/461 330/288 |
| 8,089,326 B2 * | 1/2012 | Weng | H03K 3/011 331/70 |
| 10,534,390 B2 * | 1/2020 | Yasusaka | G05F 1/575 |
| 11,119,519 B2 * | 9/2021 | Yasusaka | G05F 1/575 |
| 2016/0204699 A1 | 7/2016 | Arakawa et al. | |

FOREIGN PATENT DOCUMENTS

| | | |
|---|---|---|
| CN | 101930248 | 12/2010 |
| JP | S5-896317 | 6/1983 |
| JP | S5-896318 | 6/1983 |
| JP | 2003-005846 | 1/2003 |
| JP | 2016-130905 | 7/2016 |
| JP | 2016-212837 | 12/2016 |

OTHER PUBLICATIONS

International Search Report in International Appln. No. PCT/JP2020/044149, dated Dec. 22, 2020, 6 pages.

* cited by examiner

*Primary Examiner* — Jeffrey S Zweizig
(74) *Attorney, Agent, or Firm* — Fish & Richardson P.C.

(57) ABSTRACT

A reference voltage generation circuit includes a band gap reference circuit configured to generate a first reference voltage that depends on a band gap reference voltage and a supply voltage, and a conversion circuit configured to convert the first reference voltage into a second reference voltage. The second reference voltage depends on the band gap reference voltage and a ground voltage. The ground voltage is lower than the supply voltage.

6 Claims, 9 Drawing Sheets

REFERENCE VOLTAGE GENERATION CIRCUIT

TECHNICAL FIELD

The present invention relates to reference voltage generation circuits for generating a reference voltage.

BACKGROUND ART

Reference voltage generation circuits called band gap reference circuits are known (see, for example, Patent Document 1 identified below). The reference voltage generated by the reference voltage generation circuit disclosed in Patent Document 1 is a voltage relative to a ground voltage as a reference, and is a voltage determined by a band gap reference voltage. The band gap reference voltage is a voltage obtained by exploiting the band gap voltage of a semiconductor.

CITATION LIST

Patent Literature

Patent Document 1: JP-A-2016-212837 (FIG. 3)

Technical Problem

Figure 8:
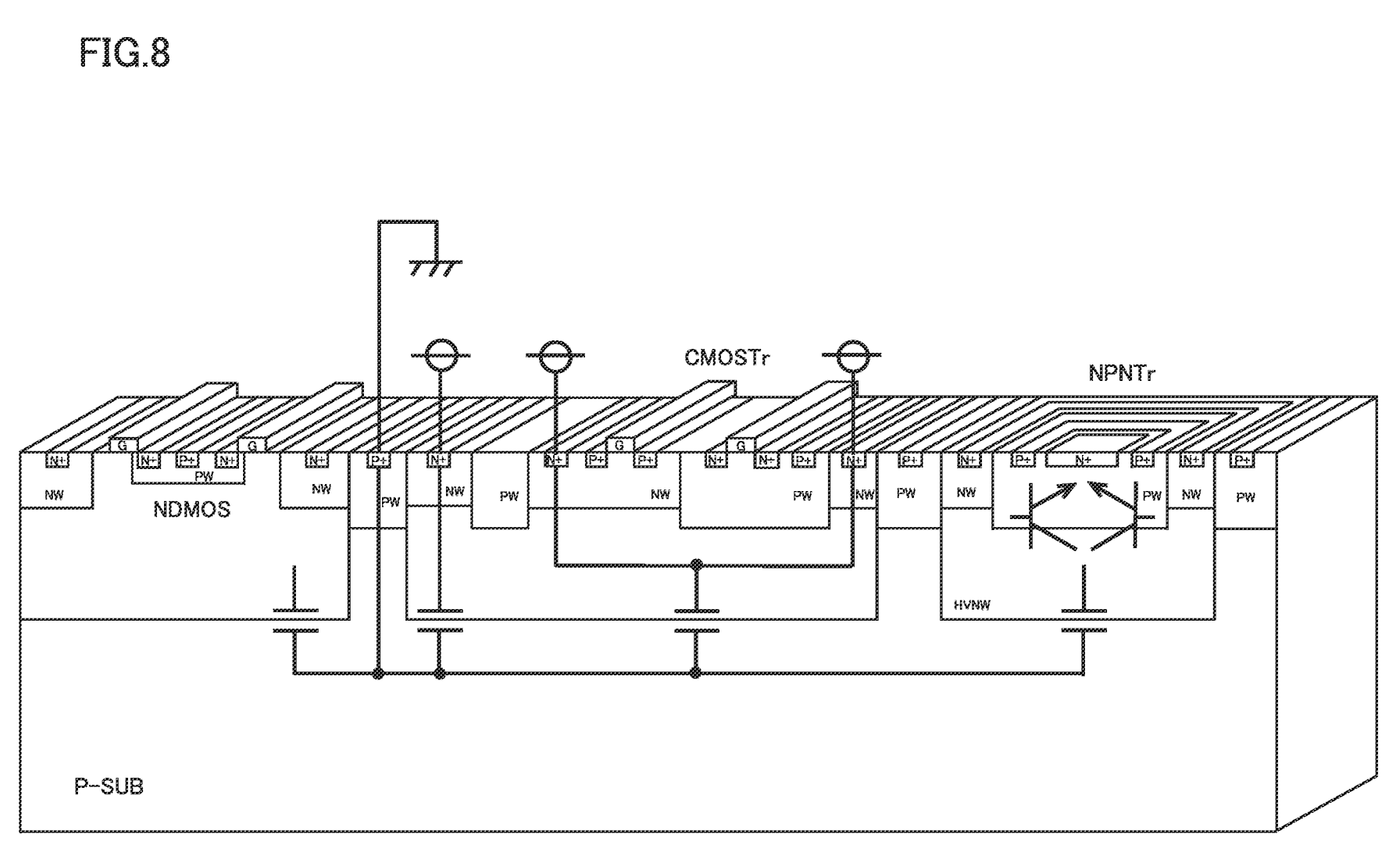
FIG. 8 is a perspective sectional view schematically showing an example of the structure of a semiconductor device.

In a semiconductor device structured as shown in FIG. 8, if a power transistor is an NDMOS transistor (N-type double-diffusion MOS transistor), the very voltage that is applied to an HVNW (high-voltage N-type well) serves as the output voltage of the transistor, and thus switching the transistor causes the voltage applied to the HVNW to vary. Through capacitance coupling, the voltage variation propagates as noise.

Figure 9:
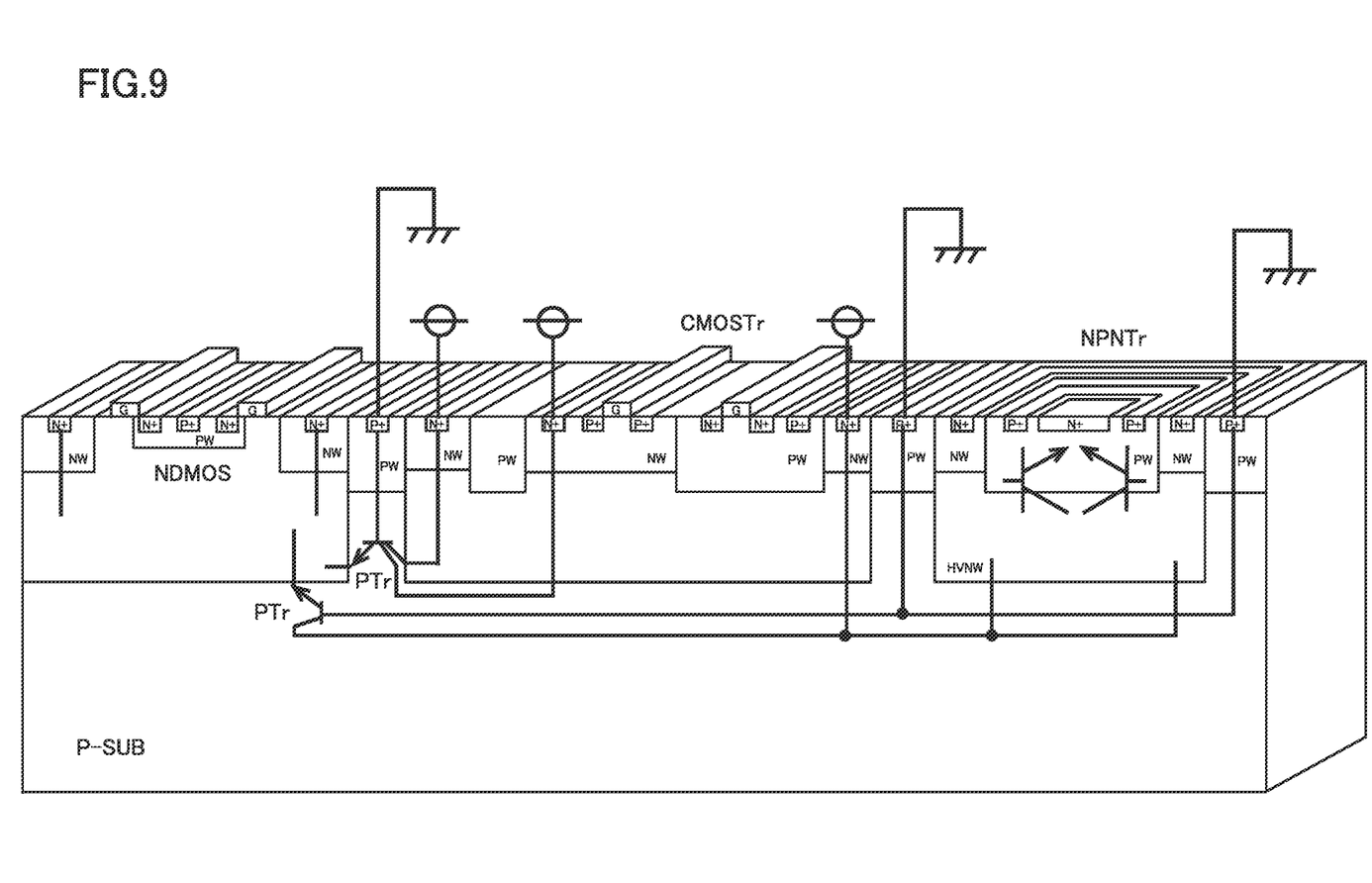
FIG. 9 is a perspective sectional view schematically showing an example of the structure of a semiconductor device.

In a semiconductor device structured as shown in FIG. 9 (identical with the semiconductor device structured as shown in FIG. 8), if the power transistor is an NDMOS transistor, when the very voltage that is applied to the HVNW becomes negative due to, for example, a regenerative current, a parasitic collector current passes through a parasitic transistor PTR.

To prevent a reference voltage generation circuit from being adversely affected by noise or parasitic current as mentioned above, the supply voltage needs to be applied to all HVNWs. Inconveniently, the reference voltage generation circuit disclosed in Patent Document 1 is so configured that an HVNW corresponding to the back gate of differential pair transistors in an amplifier and an HVNW corresponding to the anode of a diode are not connected to the supply voltage.

Solution to Problem

According to one aspect of what is disclosed herein, a reference voltage generation circuit includes: a band gap reference circuit configured to generate a first reference voltage that depends on a band gap reference voltage and a supply voltage; and a conversion circuit configured to convert the first reference voltage into a second reference voltage. The second reference voltage depends on the band gap reference voltage and a ground voltage, and the ground voltage is lower than the supply voltage. (A first configuration.)

In the reference voltage generation circuit of the first configuration described above, the conversion circuit may include an amplifier, and the output terminal of the band gap reference circuit and the first input terminal of the amplifier may be connected together with no resistive element therebetween. (A second configuration.)

In the reference voltage generation circuit of the second configuration described above, the conversion circuit may further include: a first transistor between a first application terminal, to which the supply voltage is applied, and the second input terminal of the amplifier; and a second transistor between the second input terminal of the amplifier and a second application terminal, to which the ground voltage is applied. The control terminal of the first transistor may be connected to the first application terminal, and the second reference voltage, or a division voltage of the second reference voltage, may be fed to the control terminal of the second transistor. (A third configuration.)

In the reference voltage generation circuit of the third configuration described above, the gate length of the first transistor and the gate length of the second transistor may each be greater than the gate length of a transistor within the amplifier. (A fourth configuration.)

In the reference voltage generation circuit of the fourth configuration described above, the gate length of the first transistor and the gate length of the second transistor may each be 5 μm or more. (A fifth configuration.)

In the reference voltage generation circuit of the fourth or fifth configuration described above, the gate length of the first transistor and the gate length of the second transistor may be substantially equal. (A sixth configuration.)

In the reference voltage generation circuit of any of the third to sixths configuration described above, the conversion circuit may further include a third transistor between the second input terminal of the amplifier and the second transistor, and the control terminal of the third transistor may be fed with a bias voltage. (A seventh configuration.)

According to another aspect of what is disclosed herein, a semiconductor device includes the reference voltage generation circuit of any of the first to seventh configurations described above. (An eighth configuration.)

Advantageous Effects of Invention

According to the present invention, it is possible to provide a reference voltage generation circuit with which it is possible to avoid adverse effects of noise and parasitic current.

DESCRIPTION OF EMBODIMENTS

In the present description, a MOS transistor denotes a field-effect transistor composed at least of the following three layers: a layer of an electrically conductive material or of a semiconductor with a low resistance value, such as polysilicon; an insulating layer; and a layer of a P-type, N-type, or intrinsic semiconductor. That is, the gate structure of a MOS transistor is not limited to a three-layer structure composed of a metal, an oxide, and a semiconductor. In the present description, a reference voltage denotes a voltage that stays constant under an ideal condition and that can in practice vary slightly due to temperature variation and the like.

1. Reference Voltage Generation Circuit According to One Embodiment

Figure 1:
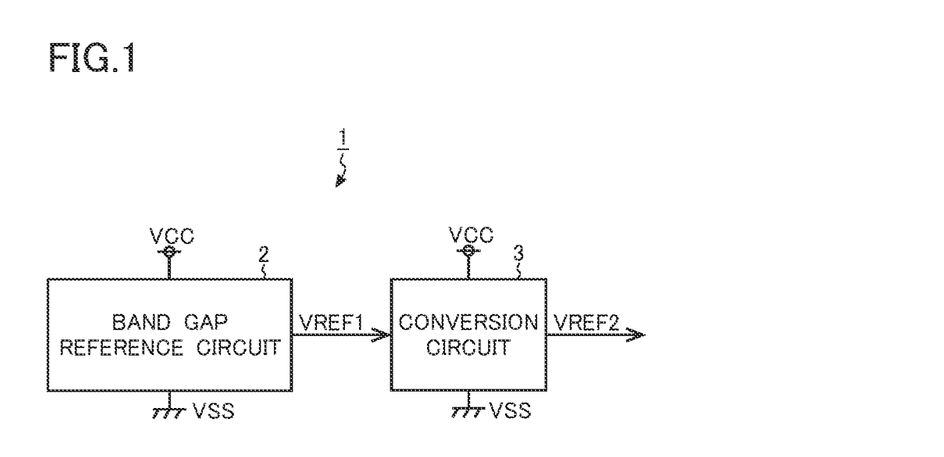
FIG. 1 is a diagram showing a reference voltage generation circuit according to one embodiment.

FIG. 1 is a diagram showing a reference voltage generation circuit according to one embodiment. The reference voltage generation circuit 1 includes a band gap reference circuit 2 and a conversion circuit 3.

The band gap reference circuit 2 generates a first reference voltage VREF1. The first reference voltage VREF1 depends on a band gap reference voltage and a supply voltage VCC. Specifically, the first reference voltage VREF1 is a voltage relative to the supply voltage VCC, and is a voltage that is determined by the band gap reference voltage. The band gap reference voltage is a reference voltage obtained by exploiting the band gap voltage of a semiconductor.

The conversion circuit 3 converts the first reference voltage VREF1 into a second reference voltage VREF2. The second reference voltage VREF2 depends on the band gap reference voltage and a ground voltage VSS. Specifically, the second reference voltage VREF2 is a voltage relative to the ground voltage VSS, and is a voltage determined by the band gap reference voltage. The ground voltage VSS is a voltage lower than the supply voltage VCC.

The band gap reference circuit 2 is configured to generate the first reference voltage VREF1 relative to the supply voltage VCC. Accordingly, all the HVNWs used to form the band gap reference circuit 2 can be connected to the supply voltage VCC. This makes it possible to avoid adverse effects of noise and parasitic current.

Including the conversion circuit 3, the reference voltage generation circuit 1 can generate the second reference voltage VREF2, which is a voltage relative to the ground voltage VSS, while avoiding adverse effects of noise and parasitic current. Since the second reference voltage VREF2 is a voltage relative to the ground voltage VSS, it can be used widely in other circuits without any restrictions.

2. First Configuration Example

Figure 2:
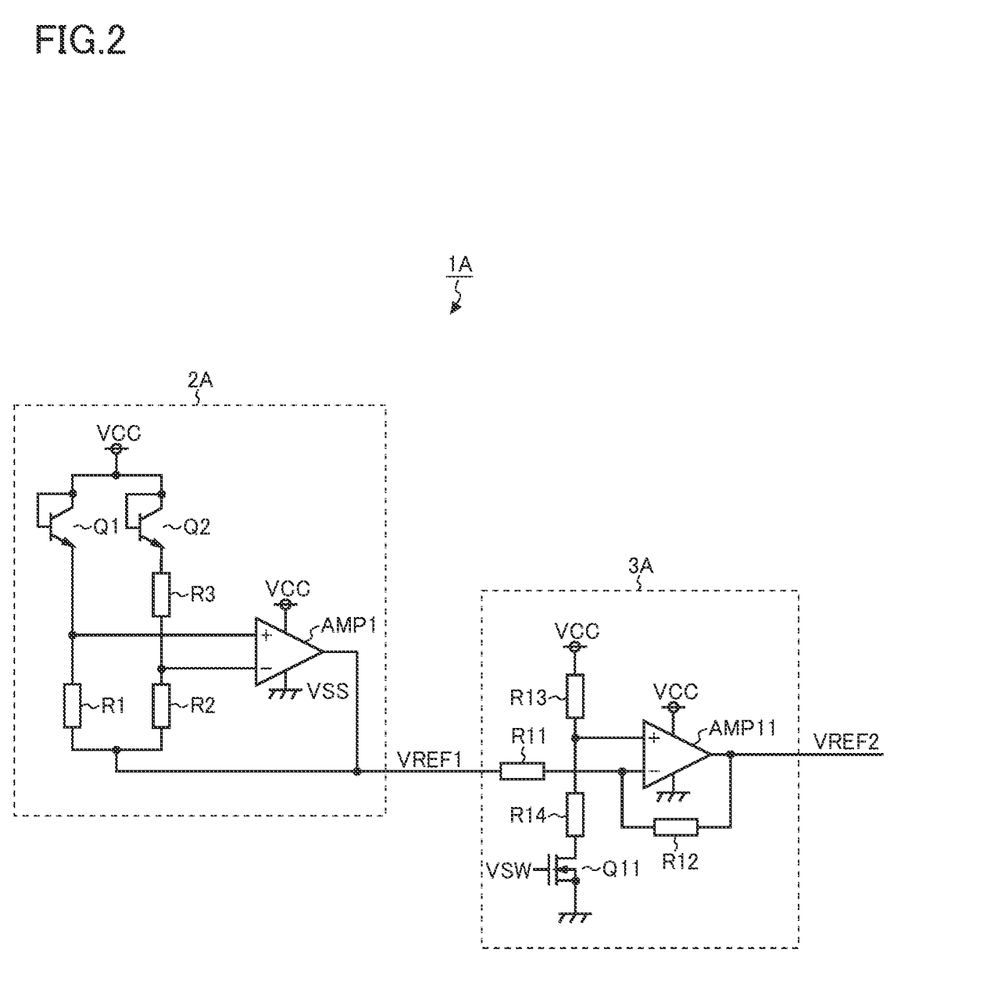
FIG. 2 is a diagram showing a first configuration example of a reference voltage generation circuit according to one embodiment.

FIG. 2 is a diagram showing a first configuration example of the reference voltage generation circuit 1. As the first configuration example of the reference voltage generation circuit 1, the reference voltage generation circuit 1A includes a band gap reference circuit 2A and a conversion circuit 3A. The band gap reference circuit 2A is one example of the band gap reference circuit 2 in FIG. 1, and the conversion circuit 3A is one example of the conversion circuit 3 in FIG. 1.

The band gap reference circuit 2A includes resistors R1 to R3 (all polysilicon resistors), NPN bipolar transistors Q1 and Q2, and an operational amplifier AMP1. The NPN bipolar transistors Q1 and Q2 are each diode-connected to function as a diode.

The first power terminal of the operational amplifier AMP1 is connected to an application terminal for the supply voltage VCC. The second power terminal of the operational amplifier AMP1 is connected to an application terminal for the ground voltage VSS.

The first terminal of the resistor R1 and the first terminal of the resistor R2 are both connected to the output terminal of the operational amplifier AMP1. The second terminal of the resistor R1 and the emitter of the NPN bipolar transistor Q1 are both connected to the non-inverting terminal (+) of the operational amplifier AMP1. The second terminal of the resistor R2 and the first terminal of the resistor R3 are both connected to the inverting input terminal (−) of the operational amplifier AMP1. The second terminal of the resistor R3 is connected to the emitter of the NPN bipolar transistor Q2. The respective bases and collectors of the NPN bipolar transistors Q1 and Q2 are all connected to the application terminal for the supply voltage VCC.

The output terminal of the operational amplifier AMP1 is the output terminal of the band gap reference circuit 2A. From the output terminal of the operational amplifier AMP1, the first reference voltage VREF1 is output.

The conversion circuit 3A includes resistors R11 to R14 (all polysilicon resistors), an N-channel MOS transistor Q11, and an operational amplifier AMP11. The conversion circuit 3A is a differential amplifier circuit using the operational amplifier AMP11.

The first power terminal of the operational amplifier AMP11 is connected to the application terminal for the supply voltage VCC. The second power terminal of the operational amplifier AMP11 is connected to the application terminal for the ground voltage VSS.

The first terminal of the resistor R11 is the input terminal of the conversion circuit 3A, and is fed with the first reference voltage VREF1. The second terminal of the resistor R11 and the first terminal of the resistor R12 are both connected to the inverting input terminal (−) of the operational amplifier AMP11. The second terminal of the resistor R12 is connected to the output terminal of the operational amplifier AMP11. The first terminal of the resistor R13 is connected to the application terminal for the supply voltage VCC. The second terminal of the resistor R13 and the first terminal of the resistor R14 are both connected to the non-inverting terminal (+) of the operational amplifier AMP11. The second terminal of the resistor R14 is connected to the drain of the N-channel MOS transistor Q11. The source and back gate of the N-channel MOS transistor Q11 are connected to the application terminal for the ground voltage VSS. The gate of the N-channel MOS transistor Q11 is fed with a gate voltage VSW, which is a signal for switching the N-channel MOS transistor Q11 between on and off. Turning the N-channel MOS transistor Q11 off permits the steady current in the conversion circuit 3A to be cut off.

The output terminal of the operational amplifier AMP11 is the output terminal of the reference voltage generation circuit 1A. From the output terminal of the operational amplifier AMP11, the second reference voltage VREF2 is output.

If it is assumed that the resistance values of the resistors R11 and R13 are both r1 and that the resistance values of the resistors R12 and R14 are both r2, then the second reference voltage VREF2 output from the reference voltage generation circuit 1A is given by Expression (1) below. In Expression (1), BGR represents the band gap reference voltage.

$$\text{VREF2} \approx BGR \cdot r2/r1 \tag{1}$$

In the reference voltage generation circuit 1A, between the output terminal of the band gap reference circuit 2A and the inverting input terminal (−) of the operational amplifier AMP11, the resistor R11 is provided. That is, as the load to which the band gap reference voltage BGR is supplied, the resistor R11 is provided. Thus the reference voltage generation circuit 1A leaves room for improvement in terms of power consumption.

3. Second Configuration Example

Figure 3:
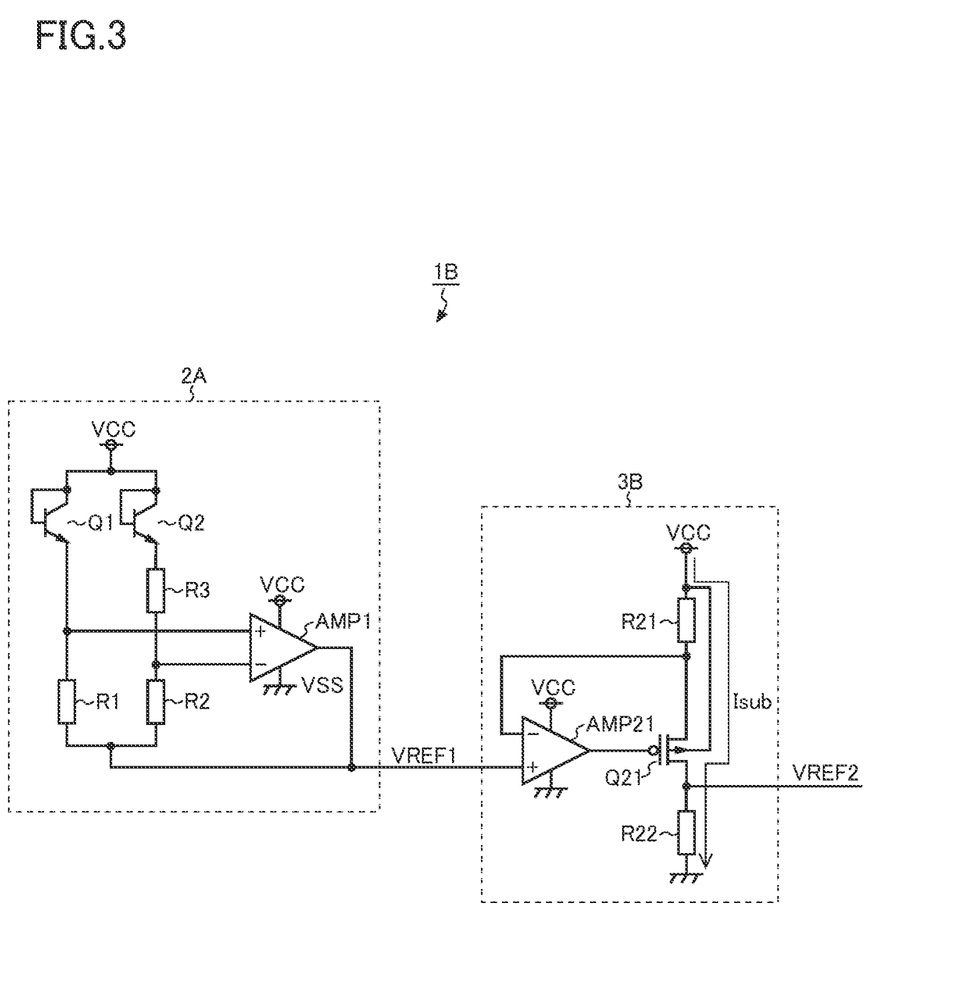
FIG. 3 is a diagram showing a second configuration example of a reference voltage generation circuit according to one embodiment.

FIG. 3 is a diagram showing a second configuration example of the reference voltage generation circuit 1. In FIG. 3, such parts as find their counterparts in FIG. 2 are identified by the same reference signs and no detailed description of them will be repeated. As the second configuration example of the reference voltage generation circuit 1, the reference voltage generation circuit 1B includes the band gap reference circuit 2A and a conversion circuit 3B. Like the conversion circuit 3A described above, the conversion circuit 3B is one example of the conversion circuit 3 in FIG. 1.

The conversion circuit 3B includes an operational amplifier AMP21, resistors R21 and R22 (both polysilicon resistors), and a P-channel MOS transistor Q21.

The first power terminal of the operational amplifier AMP21 is connected to the application terminal for the supply voltage VCC. The second power terminal of the operational amplifier AMP21 is connected to the application terminal for the ground voltage VSS.

The non-inverting terminal (+) of the operational amplifier AMP21 is the input terminal of the conversion circuit 3B, and is fed with the first reference voltage VREF1. The output terminal of the operational amplifier AMP21 is connected to the gate of the P-channel MOS transistor Q21. The first terminal of the resistor R21 is connected to the application terminal for the supply voltage VCC and to the back gate of the P-channel MOS transistor Q21. The second terminal of the resistor R21 is connected to the inverting input terminal (−) of the operational amplifier AMP21 and to the source of the P-channel MOS transistor Q21. The drain of the P-channel MOS transistor Q21 is connected to the first terminal of the resistor R22. The second terminal of the resistor R22 is connected to the ground voltage VSS.

The connection node between the drain of the P-channel MOS transistor Q21. and the first terminal of the resistor R22 is the output terminal of the reference voltage generation circuit 1B. From the connection node between the drain of the P-channel MOS transistor Q21 and the first terminal of the resistor R22, the second reference voltage VREF2 is output.

In a virtual ground condition of the operational amplifier AMP21, the second terminal of the resistor R21 is fed with the first reference voltage VREF1, and the potential difference across the resistor R21 equals the band gap reference voltage. Thus the value of the current through the resistor R21 equals the value resulting from dividing the band gap reference voltage by the resistance value of the resistor R21. Accordingly, if it is assumed that the resistance value of the resistor R21 is r1 and that the resistance value of the resistor R22 is r2, then the second reference voltage VREF2 output from the reference voltage generation circuit 1B is given by Expression (2) below. In Expression (2), BGR represents the band gap reference voltage, and ISUB represents the current that passes through the substrate.

$$\text{VREF2} \approx r2 \cdot \text{ISUB} + BGR \cdot r2/r1 \tag{2}$$

The reference voltage generation circuit 1B, in which the second reference voltage VREF2 is affected by the current ISUB passing through the substrate, leaves room for improvement in terms of temperature characteristics.

4. Third Configuration Example

Figure 4:
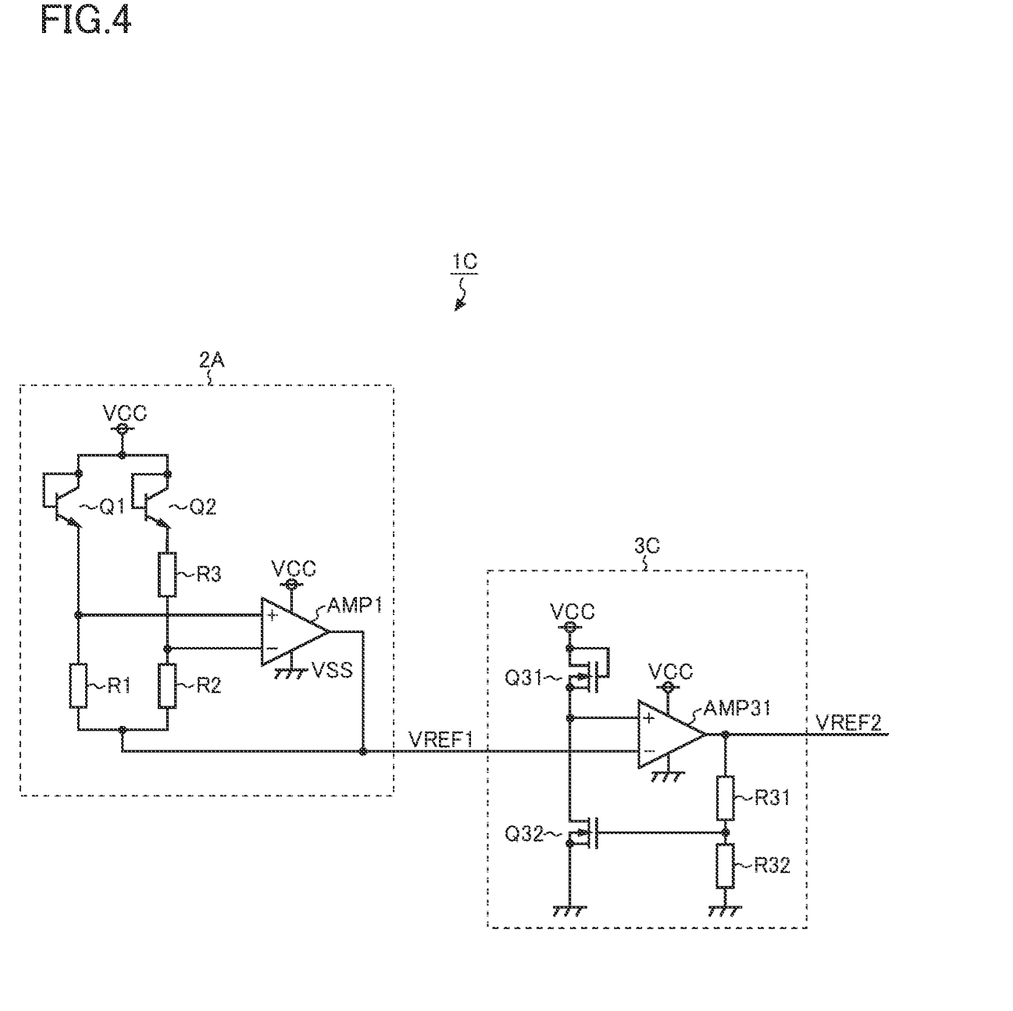
FIG. 4 is a diagram showing a third configuration example of a reference voltage generation circuit according to one embodiment.
Figure 5:
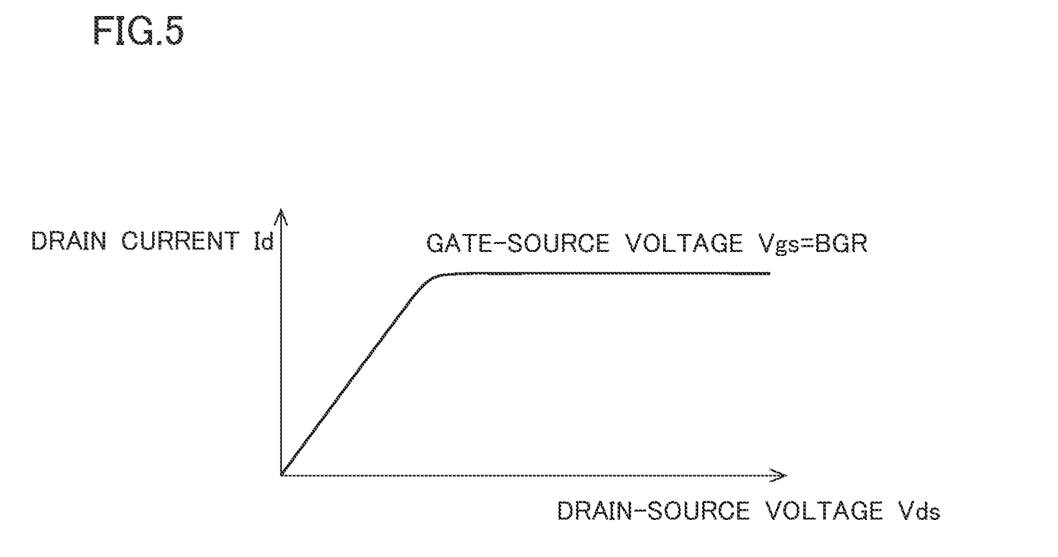
FIG. 5 is a diagram showing the characteristics of the N-channel MOS transistors connected to the non-inverting input terminal of an operational amplifier in the third configuration example.

FIG. 4 is a diagram showing a third configuration example of the reference voltage generation circuit 1. In FIG. 4, such parts as find their counterparts in FIG. 2 are identified by the same reference signs and no detailed description of them will be repeated. As the third configuration example of the reference voltage generation circuit 1, the reference voltage generation circuit 1C includes the band gap reference circuit 2A and a conversion circuit 3C. Like the conversion circuits 3A and 3B described above, the conversion circuit 3C is one example of the conversion circuit 3 in FIG. 1.

The conversion circuit 3C includes N-channel MOS transistors Q31 and Q32, an operational amplifier AMP31, and resistors R31 and R32 (both polysilicon resistors).

The first power terminal of the operational amplifier AMP31 is connected to the application terminal for the supply voltage VCC. The second power terminal of the operational amplifier AMP31 is connected to the application terminal for the ground voltage VSS.

The inverting input terminal (−) of the operational amplifier AMP31 is the input terminal of the conversion circuit 3C, and is fed with the first reference voltage VREF1. The drain and gate of the N-channel MOS transistor Q31 are connected to the application terminal for the supply voltage VCC. The source and back gate of the N-channel MOS transistor Q31 and the drain of the N-channel MOS transistor Q32 are connected to the non-inverting terminal (+) of the operational amplifier AMP31. The source and back gate of the N-channel MOS transistor Q32 are connected to the ground voltage VSS.

The output terminal of the operational amplifier AMP31 is the output terminal of the reference voltage generation circuit 1C. From the output terminal of the operational amplifier AMP31, the second reference voltage VREF2 is output.

The output terminal of the operational amplifier AMP31 is connected to the first terminal of the resistor R31. The second terminal of the resistor R31 is connected to the first terminal of the resistor R32 and to the gate of the N-channel MOS transistor Q32. The second terminal of the resistor R32 is connected to the ground voltage VSS. Here, the resistors R31 and R32 may be omitted, in which case the output terminal of the operational amplifier AMP31 can be connected directly to the gate of the N-channel MOS transistor Q32. That is, the gate of the N-channel MOS transistor Q32 may be fed with the second reference voltage VREF2 instead of a division voltage of the second reference voltage VREF2.

The N-channel MOS transistor Q31 and the N-channel MOS transistor Q32 are connected in series, and thus the drain current of the N-channel MOS transistor Q31 and the drain current of the N-channel MOS transistor Q32 are equal.

In the reference voltage generation circuit 1C, the N-channel MOS transistors Q31 and Q32 are given characteristics as shown in FIG. 4. Specifically, the N-channel MOS transistors Q31 and Q32 are each so configured that, with the gate-source voltage of the N-channel MOS transistor constant, in the saturation region the drain current of the N-channel MOS transistor is substantially constant irrespective of the drain-source voltage of the N-channel MOS transistor. Moreover, the N-channel MOS transistors Q31 and Q32 are given substantially identical characteristics. This results in the fulfillment of Expression (3) given later.

So that the N-channel MOS transistors Q31 and Q32 may both have the characteristics shown in FIG. 4, the N-channel MOS transistors Q31 and Q32 are given an increased channel length, and are given a substantially identical shape. For example, the N-channel MOS transistors Q31 and Q32 can be given a channel length greater than the gate length of a transistor within the operational amplifier AMP31. Though depending on the accuracy required in the second reference voltage VREF2, for example, giving the N-channel MOS transistors Q31 and Q32 each a gate length of 5 μm or more will bring a satisfactory degree of substantial evenness between the drain currents of the N-channel MOS transistors Q31 and Q32 in the saturation region and thus satisfactory accuracy in the second reference voltage VREF2. For example, the N-channel MOS transistors Q31 and Q32 can be give a substantially equal gate length.

In a virtual ground condition of the operational amplifier AMP31, the source of the N-channel MOS transistor Q31 is fed with the first reference voltage VREF1, and the gate-source voltage of the N-channel MOS transistor Q31 equals the band gap reference voltage. On the other hand, the gate-source voltage of the N-channel MOS transistor Q32 is a division voltage of the second reference voltage VREF2. Thus, if it is assumed that the resistance value of the resistor R31 is r1 and the resistance value of the resistor R32 is r2, then the second reference voltage VREF2 output from the reference voltage generation circuit 1C is given by Expression (3) below. In Expression (3), BGR represents the band gap reference voltage.

$$VREF2 \approx BGR \cdot (r1+r2)/r2 \quad (3)$$

5. Fourth Configuration Example

Figure 6:
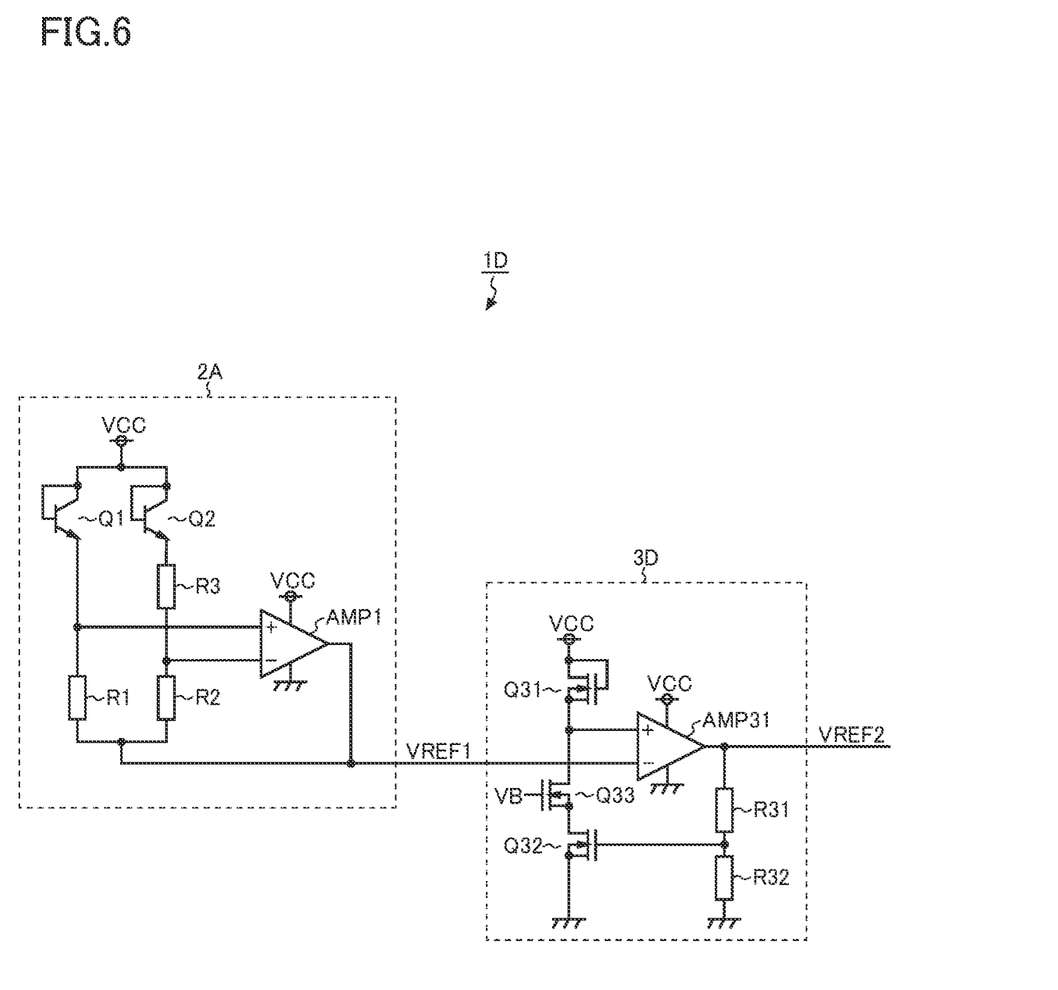
FIG. 6 is a diagram showing a fourth configuration example of a reference voltage generation circuit according to one embodiment.

FIG. 6 is a diagram showing a fourth configuration example of the reference voltage generation circuit 1. In FIG. 6, such parts as find their counterparts in FIG. 4 are identified by the same reference signs and no detailed description of them will be repeated. As the fourth configuration example of the reference voltage generation circuit 1, the reference voltage generation circuit 1D includes the band gap reference circuit 2A and a conversion circuit 3D. Like the conversion circuits 3A to 3C described above, the conversion circuit 3D is one example of the conversion circuit 3 in FIG. 1.

The conversion circuit 3D in FIG. 6 has a configuration that results from adding an N-channel MOS transistor Q33 to the conversion circuit 3C in FIG. 4.

The N-channel MOS transistor Q33 is provided between the N-channel MOS transistors Q31 and Q32. The drain of the N-channel MOS transistor Q33 is connected to the source and back gate of the N-channel MOS transistor Q31 and to the non-inverting terminal (+) of the operational amplifier AMP31. The source and back gate of the N-channel MOS transistor Q33 are connected to the drain of the N-channel MOS transistor Q32. The gate of the N-channel MOS transistor Q33 is fed with a predetermined bias voltage VB.

Compared with the conversion circuit 3C in FIG. 4, the conversion circuit 3D in FIG. 6 operates with less variation in the drain-source voltage of each of the N-channel MOS transistors Q31 and Q32 against variation in the supply voltage VCC. Accordingly, compared with the reference voltage generation circuit 1C in FIG. 4, the reference voltage generation circuit 1D in FIG. 6 offers improved stability of the second reference voltage VREF2.

Owing to, compared with the conversion circuit 3C in FIG. 4, the conversion circuit 3D in FIG. 6 operating with less variation in the drain-source voltage of each of the N-channel MOS transistors Q31 and Q32 against variation in the supply voltage VCC, though depending on the accuracy required in the second reference voltage VREF2, the reference voltage generation circuit 1D shown in FIG. 6 can be configured such that the N-channel MOS transistors Q31 and Q32 are not given an increased channel length.

6. Application

Figure 7A:
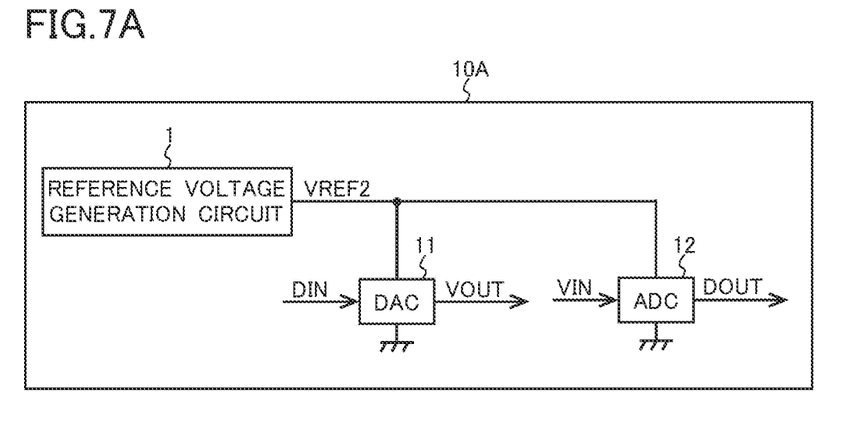
FIGS. 7A to 7C are block diagrams of examples of semiconductor devices provided with a reference voltage generation circuit according to one embodiment.
Figure 7B:
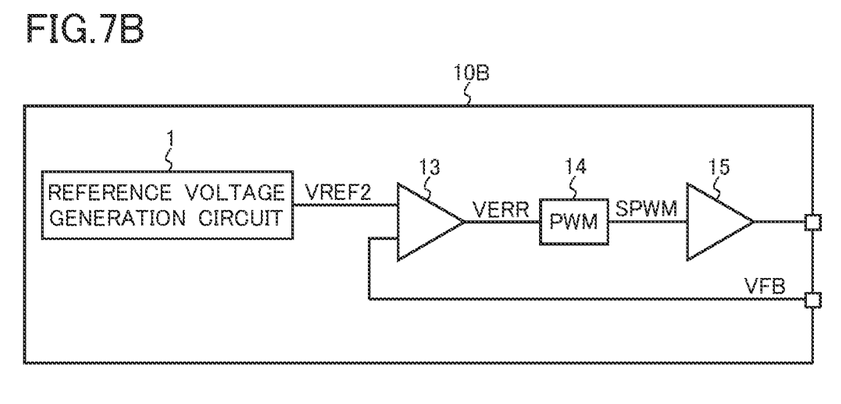
Figure 7C:
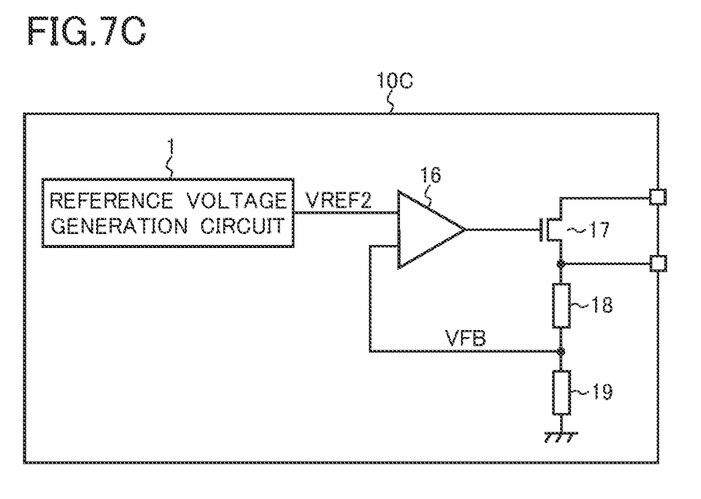

Next, examples of application of the reference voltage generation circuit 1 described earlier will be described. FIGS. 7A to 7C are block diagrams showing examples of semiconductor devices provided with the reference voltage generation circuit 1. The semiconductor device 10A in FIG. 7A includes, in addition to the reference voltage generation circuit 1, at least one of a D/A converter 11 and an A/D converter 12. The D/A converter 11 converts a digital signal DIN into an analog voltage VOUT. The second reference voltage VREF2 output from the reference voltage generation circuit 1 is supplied to the reference voltage terminal of the D/A converter 11.

The A/D converter 12 converts an analog voltage VIN into a digital signal DOUT. The second reference voltage VREF2 output from the reference voltage generation circuit 1 is supplied to the reference voltage terminal of the A/D converter 12. The semiconductor device 10A can be, for example, a DSP (digital signal processor) for audio and other applications, a microcomputer, an ASIC (application-specific IC), or an FPGA (field-programmable gate array).

The semiconductor device 10B in FIG. 7B is a control circuit for a DC/DC converter. The semiconductor device 10B includes, in addition to the reference voltage generation circuit 1, an error amplifier 13, a pulse modulator 14, and a driver 15. The error amplifier 13 outputs an error voltage VERR resulting from amplifying the error between a feedback voltage VFB, which reflects the output voltage of the DC/DC converter, and the second reference voltage VREF2. The pulse modulator 14 generates a pulse signal SPWM with a duty factor reflecting the error voltage VERR output from the error amplifier 13. The driver 15 drives a switching transistor (not illustrated) in the DC/DC converter based on the pulse signal SPWM. The DC/DC converter may employ any topology and any control method.

The semiconductor device 10B may incorporate at least one of a circuit that generates the feedback voltage VFB and the switching transistor.

The semiconductor device 10C in FIG. 7C is a control circuit for a linear regulator. The semiconductor device 10C includes, in addition to the reference voltage generation circuit 1, an error amplifier 16, an output transistor 17, and voltage division resistors 18 and 19. The voltage division resistors 18 and 19 produce a feedback voltage VFB that reflects the output voltage of the linear regulator. The error amplifier 16 outputs an error voltage VERR resulting from amplifying the error between the feedback voltage VFB, which reflects the output voltage of the DC/DC converter, and the second reference voltage VREF2. The output transistor 17 is driven in accordance with the error voltage VERR.

At least one of a circuit (i.e., the voltage division resistors 18 and 19) that generates the feedback voltage VFB and the output transistor 17 may be provided outside the semiconductor device 10C.

As described above, the reference voltage generation circuit 1 can be used in a variety of semiconductor devices.

7. Modifications

The present invention can be implemented in any other manners than as in the embodiments described above without departure from the spirit of the invention. The embodiments described above should be considered to be in every aspect illustrative and not restrictive, and the technical scope of the present invention is defined not by the description of embodiments given above but by the scope of the appended claims and should be understood to encompass any modifications within a spirit and scope equivalent to the claims.

For example, it is preferable that the circuit elements that constitute the reference voltage generation circuit 1 be formed within an N-type well to which the supply voltage VCC is applied. In that way it is possible to suppress variation in the band gap reference voltage against variation in the supply voltage VCC.

REFERENCE SIGNS LIST

1, 1A to 1C reference voltage generation circuit
2 band gap reference circuit
3, 3A to 3C conversion circuit
10A to 10C semiconductor device

The invention claimed is:

1. A reference voltage generation circuit, comprising:
a band gap reference circuit configured to generate a first reference voltage that depends on a band gap reference voltage and a supply voltage; and
a conversion circuit configured to convert the first reference voltage into a second reference voltage,
wherein:
the second reference voltage depends on the band gap reference voltage and a ground voltage,
the ground voltage is lower than the supply voltage,
the conversion circuit includes an amplifier,
an output terminal of the band gap reference circuit and a first input terminal of the amplifier are connected together with no resistive element therebetween, and
the conversion circuit further includes:
a first transistor between a first application terminal, to which the supply voltage is applied, and a second input terminal of the amplifier; and
a second transistor between the second input terminal of the amplifier and a second application terminal, to which the ground voltage is applied,
wherein:
a control terminal of the first transistor is connected to the first application terminal, and
the second reference voltage, or a division voltage of the second reference voltage, is fed to the control terminal of the second transistor.

2. The reference voltage generation circuit according to claim 1, wherein
a gate length of the first transistor and a gate length of the second transistor are each greater than a gate length of a transistor within the amplifier.

3. The reference voltage generation circuit according to claim 2, wherein
the gate length of the first transistor and the gate length of the second transistor are each 5 μm or more.

4. The reference voltage generation circuit according to claim 2, wherein
the gate length of the first transistor and the gate length of the second transistor are substantially equal.

5. The reference voltage generation circuit according to claim 1, wherein
the conversion circuit further includes a third transistor between the second input terminal of the amplifier and the second transistor, and
a control terminal of the third transistor is fed with a bias voltage.

6. A semiconductor device, comprising:
the reference voltage generation circuit according to claim 1.

* * * * *